(12) United States Patent
Chen (10) Patent No.: US 9,481,201 B2
(45) Date of Patent: Nov. 1, 2016

(54) SPOKE WITH ENHANCED FATIGUE RESISTANCE

(71) Applicant: Sha-Dar Accessories Co., Ltd., New Taipei (TW)

(72) Inventor: Wen-Hsuan Chen, New Taipei (TW)

(73) Assignee: SHA-DAR ACCESSORIES CO., LTD., New Taipei (TW)

( * ) Notice: Subject to any disclaimer, the term of this patent is extended or adjusted under 35 U.S.C. 154(b) by 102 days.

(21) Appl. No.: 14/516,584

(22) Filed: Oct. 17, 2014

(65) Prior Publication Data

US 2016/0107479 A1    Apr. 21, 2016

(51) Int. Cl.
*B60B 1/02*    (2006.01)
*B60B 1/04*    (2006.01)

(52) U.S. Cl.
CPC .............. *B60B 1/0261* (2013.01); *B60B 1/048* (2013.01); *B60B 2900/311* (2013.01)

(58) Field of Classification Search
CPC ... B60B 1/0261; B60B 1/0246; B60B 1/003; B60B 1/048
See application file for complete search history.

(56) References Cited

U.S. PATENT DOCUMENTS

| | | | | |
|---|---|---|---|---|
| 6,126,243 A | * | 10/2000 | Okajima | B60B 1/0223 301/104 |
| 7,354,114 B2 | * | 4/2008 | Passarotto | B60B 1/003 301/104 |
| 2004/0174066 A1 | * | 9/2004 | Dietrich | B60B 21/062 301/104 |

* cited by examiner

*Primary Examiner* — John Walters
*Assistant Examiner* — James Triggs
(74) *Attorney, Agent, or Firm* — Leong C. Lei (57) ABSTRACT

A spoke includes a spoke body that has two ends respectively forming a terminal section and the threaded section and includes a neck section arranged below the terminal section; a first flattened section set at a location below the neck section; and a second flattened section set at a location below the first flattened section in such a way that the second flattened section and the first flattened section are at different horizontal plane. In assembling the spoke body to a wheel hub and a wheel rim, the combination of the first flattened section and the second flattened section helps set the spoke body at a correct position and direction for assembly and force taking, whereby the first flattened section may absorb torsion and the second flattened section helps transfer tension and allows for change of the angle of bending.

9 Claims, 8 Drawing Sheets

SPOKE WITH ENHANCED FATIGUE RESISTANCE

BACKGROUND OF THE INVENTION (a) Technical Field of the Invention

Figure 7:
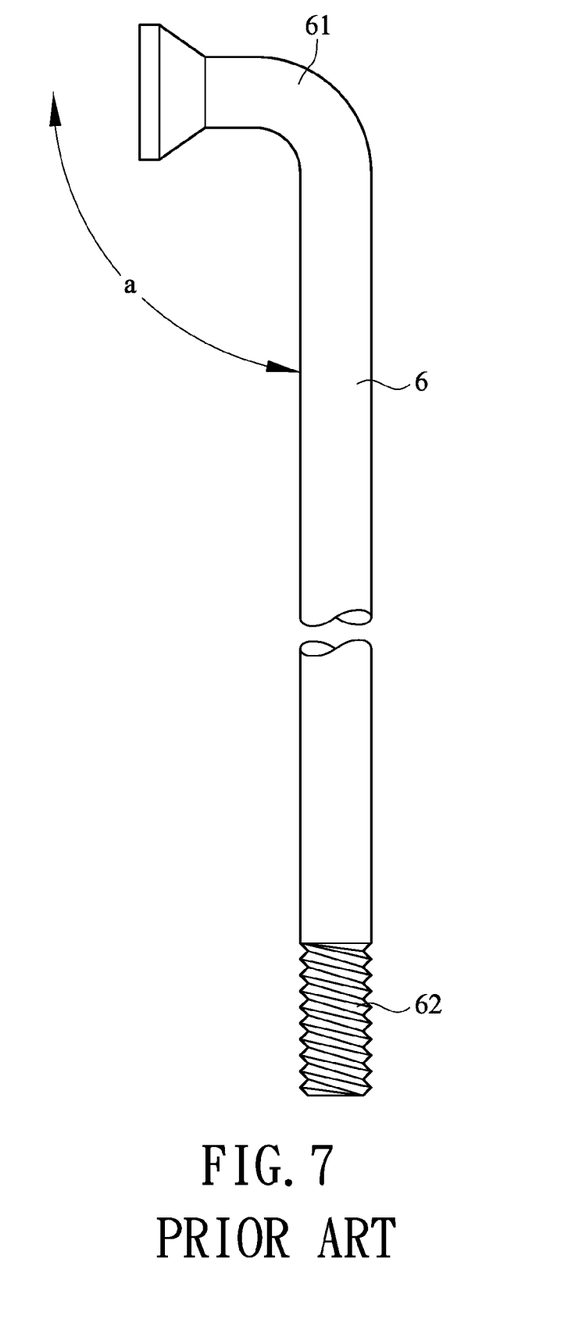
FIG. 7 is a schematic view showing an outer configuration of a traditional spoke.

The present invention generally relates to a spoke with enhanced fatigue resistance, and more particularly to a spoke that allows for, in a process of assembling a spoke body to a wheel hub and a wheel rim, the use of a combination of a first flattened section and a second flattened section to set the spoke body at a correct position and direction for assembly and force taking, whereby the first flattened section absorbs torsion and the second flattened section helps transfer tension and allows for change of the angle of bending so that the spoke body, when put into use, effectively absorbs or transfers shock waves transmitted thereto and thus significantly enhancing the capability of the spoke body for fatigue resistance and greatly reducing the chance of the spoke body getting broken (b) Description of the Prior Art A traditional spoke 6 (as shown in FIG. 7) used in a bicycle or a motorcycle comprises a bend section 61 and a threaded section 62 and the bend section 61 has a fixed angle a. Such an arrangement has been widely used in the industry. However, it is not popularly used in wheel sets that have less numbers of spokes 6. This is because it is found by manufacturers and assemblers that the bend section 61 often gets broken easily and abnormally. A guess has been made, according to experiences, that the bend section 61 having insufficient resistance against fatigue is the major cause of the occurrence of the abnormal breaking. However, although there are a huge number of abnormal breaking events, there is still no way that a correct explanation can be obtained empirically and repeated tests have been adopted to identify that instantaneous torsion and tensions of abnormal angles at the portion below the bend section 61 are primary factor for the easy and abnormal breaking. Thus, improvements have to be made in respect of the torsion and the angle in which forces are applied thereto.

Further, the angle a of the spoke 6 is normally specified in the industry. For a spoke having a diameter of 2.0 mm, the angle a of the bend section 61 must be set 95 degrees. This makes the angles of the bend sections 61 consistent, simplifying the process of manufacture of the spokes 6 and also allowing for efficient assembly of the spokes 6 and thus reducing stocks of the workshops.

Figure 8:
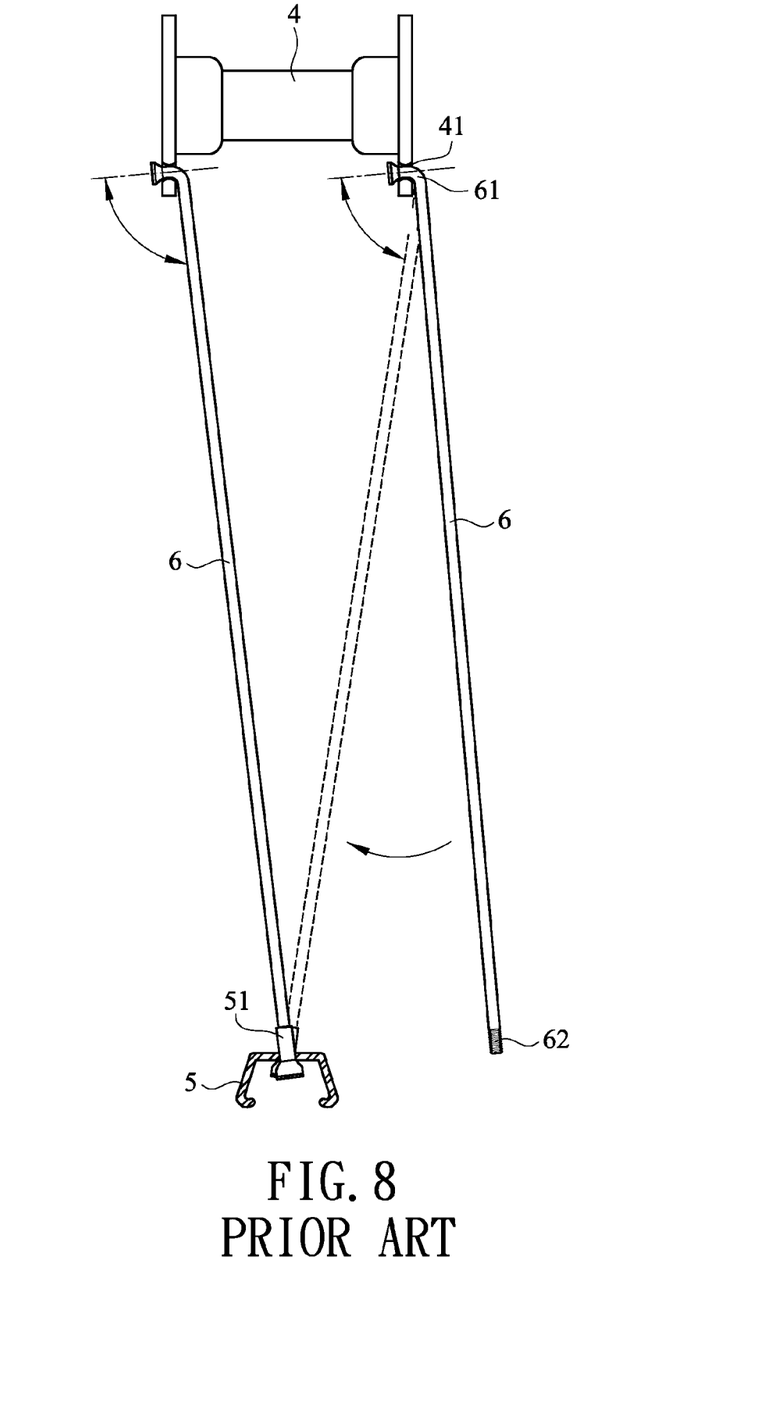
FIG. 8 is a schematic view showing the traditional spoke in an assembled condition.

However, when a spoke 6 is put through a through hole 411 of a hub 4 to be assembled to a threaded section 51 of a wheel rim 5 (as shown in FIG. 8), at least two different angles are needed for the bend sections 61 because in actual assembly operations, different wheel radii require different angles of the bend sections 61 and incorrect angle of the bend section 61 will affect the strength of the spoke 6, leading to an obvious reduction of the fatigue resistance of the spoke 6 and eventually causing easy happening of breaking of the bend section 61.

Figure 9:
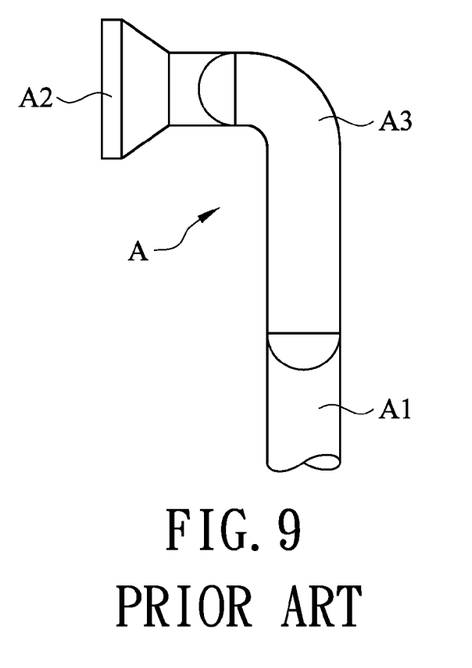
FIG. 9 is a schematic view showing a known spoke.
Figure 10:
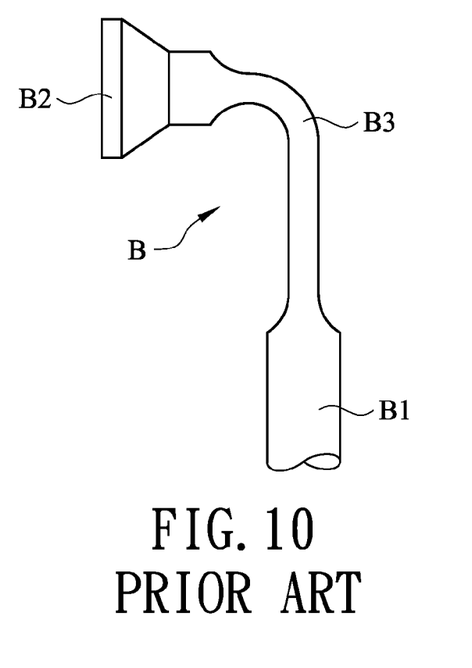
FIG. 10 is a schematic view showing another known spoke.

Further, there are other known spokes, which are respectively designated by reference characters A and B in FIGS. 9 and 10, in which a flattened bend section A3, B3 is formed between a middle section A1, B1 and a terminal section A2, B2 for the purposes of improving the above-discussed drawbacks. In actual tests, the traditional spoke 6, the known spoke A, and the known spoke B are subjected to fatigue tests under the condition of 180 kgf/10 Hz for cyclically repeated stretching and releasing. The result of the tests indicates the average performances of these known spokes are respectively 11,632 cycles, 21,133 cycles, and 6,472 cycles. The traditional spoke 6 is easily broken at the bend section 61. The known spoke A has a flattened bend section A3 that possesses better fatigue resistance, but is hard to be assembled to a wheel hub and may causes an abnormal angle with respect to the wheel rim, leading to easy breaking of the threaded section. Further, the known spoke B has a flattened bend section B3 that is extremely easily broken and shows a capability of fatigue resistance that is worse than the traditional spoke.

The above-described tests reveal that the traditional spoke 6, the known spoke A, and the known spoke B all possess shortcomings in assembling and use.

SUMMARY OF THE INVENTION

The primary object of the present invention is to allow for, in a process of assembling a spoke body to a wheel hub and a wheel rim, the use of the combination of a first flattened section and a second flattened section to set the spoke body at a correct position and direction for assembly and force taking, whereby the first flattened section may absorb torsion and the second flattened section helps transfer tension and allows for change of the angle of bending so that the spoke body, when put into use, may effectively absorb or transfer shock waves transmitted thereto and thus significantly enhancing the capability of the spoke body for fatigue resistance and greatly reducing the chance of the spoke body getting broken.

To achieve the above object, the present invention provides a spoke with enhanced fatigue resistance, which comprises: a spoke body, which has two ends respectively forming a terminal section and a threaded section and comprises a neck portion located below the terminal section; a first flattened section, which is set at a location below the neck section; and a second flattened section, which is set at a location below the first flattened section in such a way that the second flattened section and the first flattened section are at different horizontal planes.

In an embodiment of the present invention, the neck section is of a bent configuration.

In an embodiment of the present invention, the neck section is of a straight linear configuration.

In an embodiment of the present invention, the first flattened section has two sides each forming a flat surface and each of the flat surfaces is in a vertical condition with respect to the terminal section.

In an embodiment of the present invention, the first flattened section has a thickness of 1.0-1.8 mm between the two flat surfaces.

In an embodiment of the present invention, the second flattened section has two sides each forming a flat surface and each of the flat surfaces is in a horizontal condition with respect to the terminal section.

In an embodiment of the present invention, the second flattened section has a thickness of 0.8-1.6 mm between the two flat surfaces.

In an embodiment of the present invention, the first flattened section has a lower end that is connected to an upper end of the second flattened section.

In an embodiment of the present invention, the first flattened section has a lower end that is spaced from an upper end of the second flattened section by a predetermined distance so that the first flattened section and the second flattened section are in a condition of being mutually spaced from each other.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
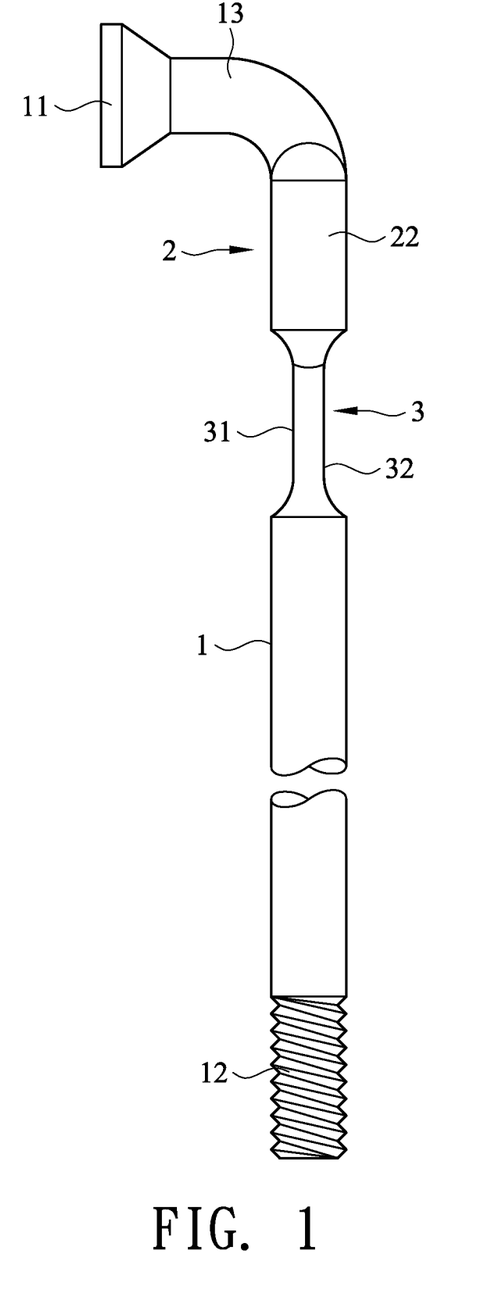
FIG. 1 is a schematic view showing an outer configuration of the present invention.
Figure 2:
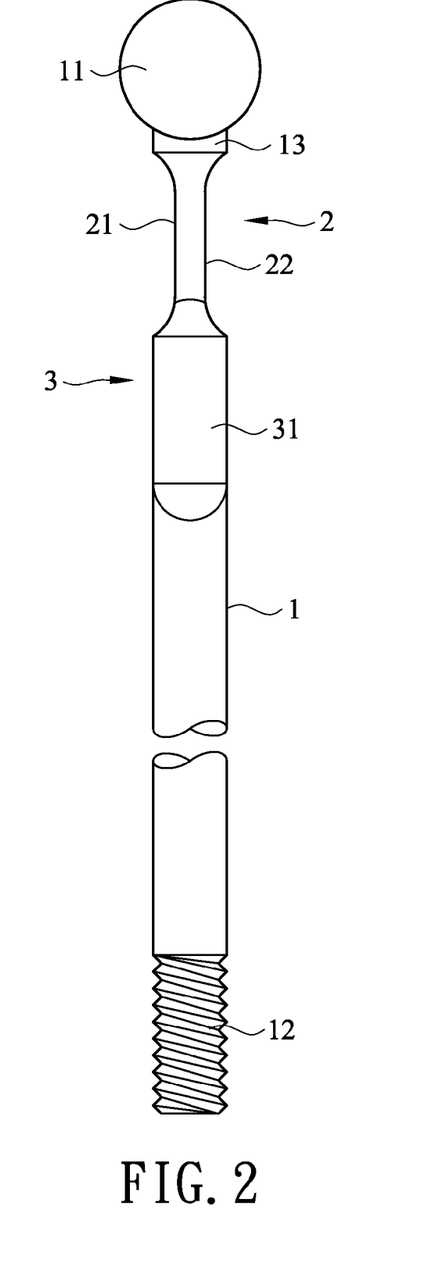
FIG. 2 is another schematic view of the present invention taken from a different angle.

Referring to FIGS. 1 and 2, which are respectively a schematic view showing an outer configuration of the present invention and another schematic view of the present invention taken from a different angle, as shown in the drawings, the present invention provides a spoke with enhanced fatigue resistance, which comprises at least a spoke body 1, a first flattened section 2, and a second flattened section 3.

The spoke body 1 has an end that forms a terminal section 11 and an opposite end forming a threaded section 12 and comprises a neck section 13 formed below the terminal section 11, where the neck section 13 is of a bent configuration.

The first flattened section 2 is set at a location below the neck section 13. The first flattened section 2 has two opposite sides each forming a flat surface 21, 22. Each of the flat surfaces 21, 22 is substantially perpendicular to the terminal section 11. A thickness of the first flattened section 2 between the two flat surfaces 21, 22 is in the range of 1.0-1.8 mm.

The second flattened section 3 is arranged at a location below the first flattened section 2 in such a way that a lower end of the first flattened section 2 is connected to a top of the second flattened section 3. Alternatively, the lower end of the first flattened section 2 may be spaced from the top of the second flattened section 3 by a predetermined distance to set the first flattened section 2 and the second flattened section 3 in a mutually spaced condition. (In the instant embodiment, the flattened sections are shown connected to each other as an illustrative example.) The second flattened section 3 and the first flattened section 2 are located on different horizontal planes. The second flattened section 3 has two opposite sides each forming a flat surface 31, 32. The flat surfaces 31, 32 are in a horizontal condition with respect to the terminal section 11. A thickness of the second flattened section 3 between the two flat surfaces 31, 32 is in the range of 0.8-1.6 mm.

Figure 3:
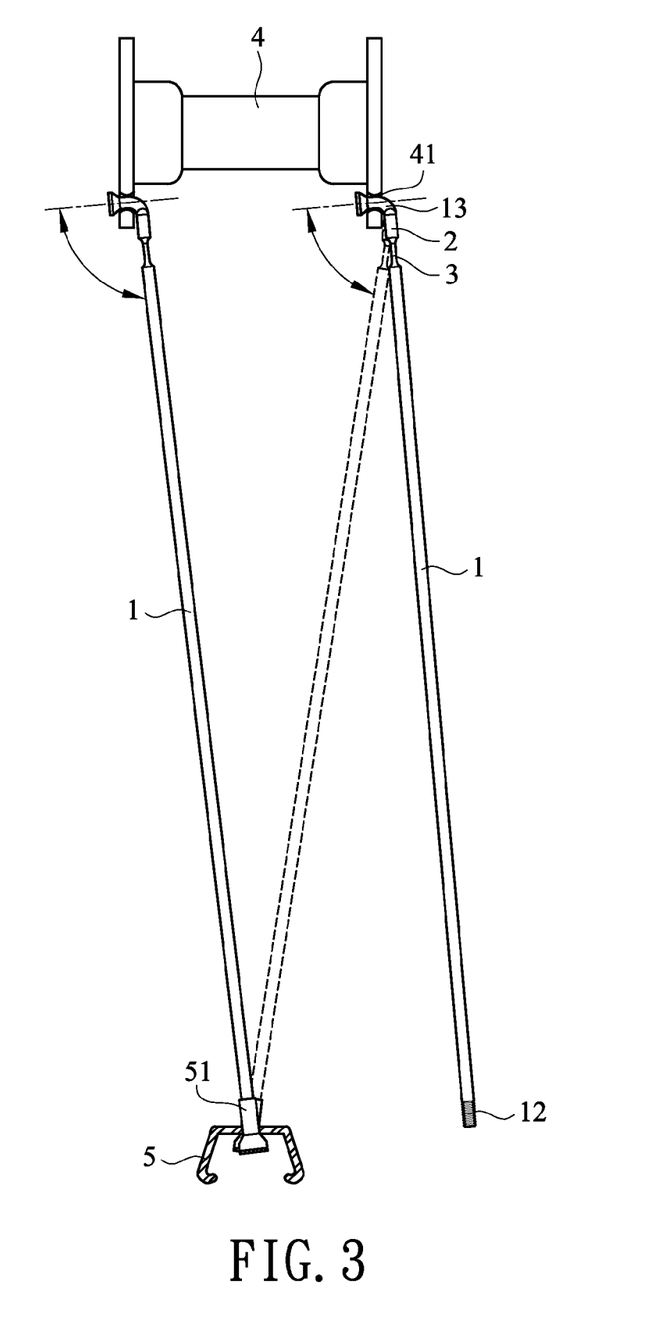
FIG. 3 is a schematic view showing the present invention in an assembled condition.
Figure 4:
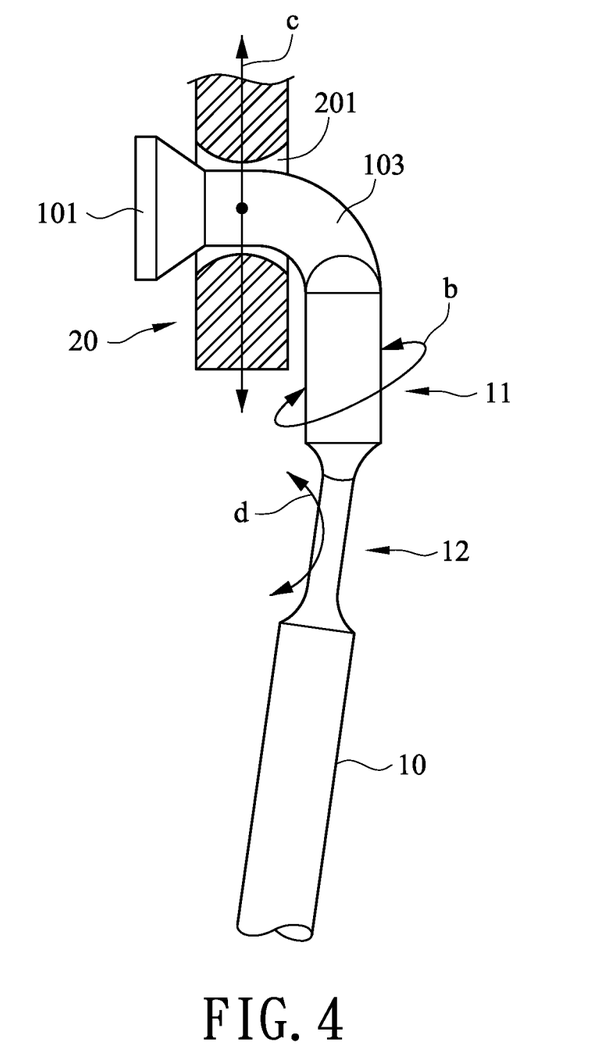
FIG. 4 is a schematic view showing the present invention, after being assembled, in a condition of use.

Also referring to FIGS. 3 and 4, which are respectively a schematic view showing the present invention in an assembled condition and a schematic view showing the present invention, after being assembled, in a condition of use, as shown in the drawings, when the present invention is put into use, a number of spoke bodies 1 are assembled to a wheel hub 4 and a wheel rim 5 in such a way that each of the spoke bodies 1 is arranged to have the end thereof that comprises the threaded section 12 extending through a corresponding through hole 41 of the wheel hub 4 to such an extent that the terminal section 11 gets into contact engagement with and thus stopped by the through hole 41. Then, the threaded section 12 of each of the spoke bodies 1 is set into engagement with and coupled to a corresponding threading engagement section 51 of the wheel rim 5. In the condition that a spoke body 1 is assembled to the wheel hub 4 and the wheel rim 5, the first flattened section 2 strengthens the stiffness in one direction and effectively absorbs a torsion applied from the terminal section 11 (see reference character b of FIG. 4), so that the second flattened section 3 that is below the first flattened section 2, under the tension induced in the assembling, is allowed to freely take a suitable angle. As such, the coordination between the first flattened section 2 and the second flattened section 3 allows the spoke body 1 to be adapted different wheel diameter and angles for installation at correct position and direction, whereby the first flattened section 2 that is of stiffness can absorb or transfer shock waves transmitting from the neck section 13 so that the neck section 13, when acted upon by vibration forces from upper and lower side, does not cause deformation. Further, the angle formed by the second flattened section 3 may help transfer tension (see reference character c of FIG. 4) and allows for change of the angle of bending (see reference character d of FIG. 4), so that the vibration shock wave can be transmitted in a correct direction to the wheel rim 5, thereby reducing the potential risk that the thread of the threaded section 12 get broken and the chance that the spoke body 1 is broken off and also improving the fatigue resistance of the spoke body 1.

Further, when the spoke body 1 that comprises the first flattened section 2 and the second flattened section 3 is subjected to a fatigue test under the condition of 180 kgf/10 Hz for cyclically repeated stretching and releasing, the result of the test shows that the average fatigue resistance capability can reach as high as 25,644 cycles and apparently, compared to the fatigue resistance capabilities of the traditional spoke 6, the known spoke A, and the known spoke B that are respectively 11,632 cycles, 21,133 cycles, and 6,472 cycles, the spoke body 1 according to the present invention indeed possesses excellent fatigue resistance and angle adaptability.

Figure 5:
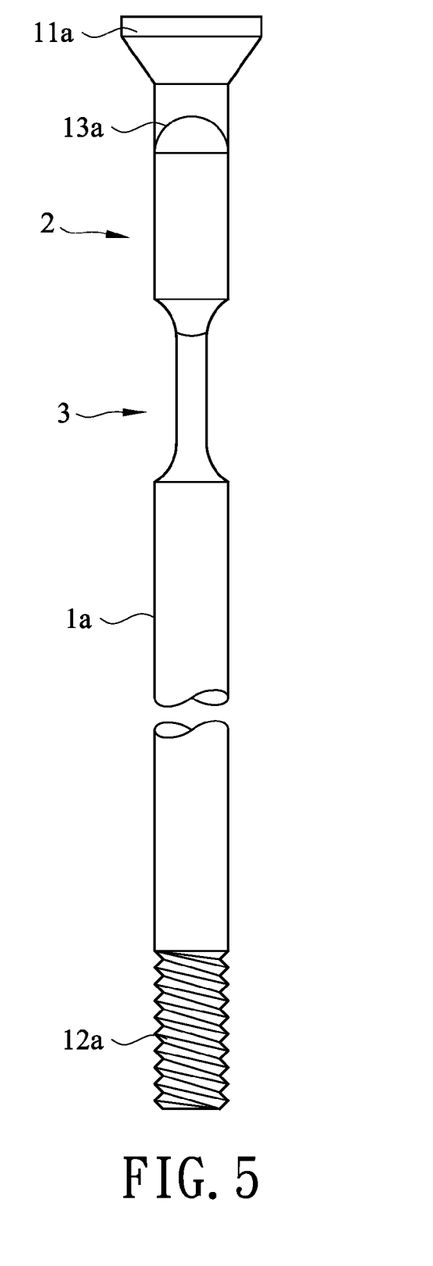
FIG. 5 is a schematic view showing an outer configuration of another embodiment of the present invention.
Figure 6:
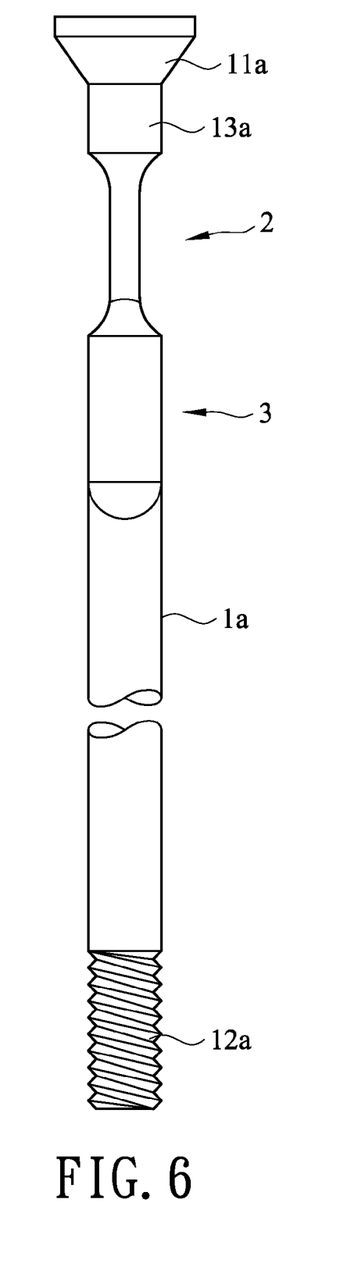
FIG. 6 is another schematic view of said another embodiment of the present invention taken from a different angle.

Also referring to FIGS. 5 and 6, which are respectively a schematic view showing an outer configuration of another embodiment of the present invention and another schematic view of said another embodiment of the present invention taken from a different angle, as shown in the drawings, in addition to the structural configuration described above, the present invention can be configured as what described in the instant embodiment and the difference is that the spoke body 1a of the instant embodiment has two ends that respectively form a terminal section 11a and a threaded section 12a but has a neck section 13a that is of a straight linear configuration. A first flattened section 2 and a second flattened section 3 are arranged at locations below the neck section 13a at different horizontal planes. In this arrangement, the spoke body 1a is set in a vertically erected form, allowing the present invention to meet different needs for different applications.

In summary, the present invention provides a spoke with enhanced fatigue resistance effectively improves the shortcomings of the prior art devices and allows for, in a process of assembling the spoke body to a wheel hub and a wheel rim, the use of the combination of a first flattened section and a second flattened section to set the spoke body at a correct position and direction for assembly and force taking, whereby the first flattened section may absorb torsion and the second flattened section helps transfer tension and allows for change of the angle of bending so that the spoke body, when put into use, may effectively absorb or transfer shock waves transmitted thereto and thus significantly enhancing the capability of the spoke body for fatigue resistance and greatly reducing the chance of the spoke body getting broken.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A spoke with enhanced fatigue resistance, comprising:
a spoke body, which has an end forming a terminal section and an opposite end forming a threaded section and comprises a neck portion located below the terminal section;
a first flattened section, which is set at a location below the neck section; and
a second flattened section, which is set at a location below the first flattened section, the second flattened section and the first flattened section being at different planes, which are angularly spaced from each other to define therebetween an included angle that is greater than zero.

2. The spoke with enhanced fatigue resistance according to claim 1, wherein the neck section is of a bent configuration.

3. The spoke with enhanced fatigue resistance according to claim 1, wherein the neck section is of a straight linear configuration.

4. The spoke with enhanced fatigue resistance according to claim 1, wherein the first flattened section has two sides each forming a flat surface, each of the flat surfaces being in a vertical condition with respect to the terminal section.

5. The spoke with enhanced fatigue resistance according to claim 4, wherein the first flattened section has a thickness of 1.0-1.8 mm between the two flat surfaces.

6. The spoke with enhanced fatigue resistance according to claim 1, wherein the second flattened section has two sides each forming a flat surface, each of the flat surfaces being in a horizontal condition with respect to the terminal section.

7. The spoke with enhanced fatigue resistance according to claim 6, wherein the second flattened section has a thickness of 0.8-1.6 mm between the two flat surfaces.

8. The spoke with enhanced fatigue resistance according to claim 1, wherein the first flattened section has a lower end that is connected to an upper end of the second flattened section.

9. The spoke with enhanced fatigue resistance according to claim 1, wherein the first flattened section has a lower end that is spaced from an upper end of the second flattened section by a predetermined distance so that the first flattened section and the second flattened section are in a condition of being mutually spaced from each other.

\* \* \* \* \*